United States Patent
Gray, III et al.

(10) Patent No.: US 7,388,887 B2
(45) Date of Patent: *Jun. 17, 2008

(54) METHODS AND SYSTEMS FOR DISTRIBUTING MULTIMEDIA DATA OVER HETEROGENEOUS NETWORKS

(75) Inventors: Donald M. Gray, III, San Francisco, CA (US); Anand Valavi, Mountain View, CA (US); Robert G. Atkinson, Woodinville, WA (US); Tom Blank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/215,481

(22) Filed: Aug. 30, 2005

(65) Prior Publication Data

US 2006/0007961 A1 Jan. 12, 2006

Related U.S. Application Data

(63) Continuation of application No. 09/836,834, filed on Apr. 17, 2001, now Pat. No. 6,970,481.

(51) Int. Cl.
*H04J 3/06* (2006.01)

(52) U.S. Cl. .................. 370/519; 370/252; 370/468
(58) Field of Classification Search .............. 370/518, 370/252, 468, 507, 508, 509, 510, 517, 519, 370/521

See application file for complete search history.

(56) References Cited

U.S. PATENT DOCUMENTS

| | | | | |
|---|---|---|---|---|
| 5,483,523 | A | * | 1/1996 | Nederlof ................ 370/394 |
| 5,793,772 | A | * | 8/1998 | Burke et al. ............ 370/508 |
| 6,038,230 | A | * | 3/2000 | Ofek ...................... 370/389 |
| 6,058,102 | A | * | 5/2000 | Drysdale et al. ........ 370/252 |
| 6,259,677 | B1 | * | 7/2001 | Jain ........................ 370/252 |
| 6,308,280 | B1 | * | 10/2001 | Joseph et al. ........... 713/400 |
| 6,363,056 | B1 | * | 3/2002 | Beigi et al. ............. 370/252 |
| 6,385,198 | B1 | * | 5/2002 | Ofek et al. .............. 370/389 |
| 6,452,541 | B1 | * | 9/2002 | Zhao et al. .......... 342/357.06 |
| 6,483,813 | B1 | * | 11/2002 | Blencowe ............... 370/252 |
| 6,347,084 | B1 | | 12/2002 | Hulyalkar et al. |

(Continued)

OTHER PUBLICATIONS

J-C. Bolot and T. Turletti, Experience with Control Mechanisms for Packet Video in the Internet, Computer Communication Review, Jan. 1998, vol. 28, No. 1, p. 4-15.

(Continued)

*Primary Examiner*—Chi Pham
*Assistant Examiner*—Kevin Mew
(74) *Attorney, Agent, or Firm*—Workman Nydegger

(57) ABSTRACT

Real-time communication of multimedia data over heterogeneous networks that may include constant delay networks, variable delay networks that have a common reckoning of time, and variable delay networks that do not have a common reckoning of time. If there are any variable delay networks in which there is no common reckoning of time in the heterogeneous networks, a common reckoning of time is established in each of those networks. Then, a constant delay network is emulated for each variable delay network using the specific common time reckoning present in each variable delay network.

9 Claims, 10 Drawing Sheets

U.S. PATENT DOCUMENTS

| | | | | |
|---|---|---|---|---|
| 6,661,810 B1* | 12/2003 | Skelly et al. | | 370/516 |
| 6,778,537 B1* | 8/2004 | Ishibashi | | 370/395.62 |
| 6,820,150 B1* | 11/2004 | Joy et al. | | 710/110 |
| 7,023,882 B2* | 4/2006 | Woodward et al. | | 370/487 |
| 7,023,884 B2* | 4/2006 | Chuah et al. | | 370/507 |
| 7,031,306 B2* | 4/2006 | Amaral et al. | | 370/389 |
| 2001/0053130 A1* | 12/2001 | Tanaka et al. | | 370/252 |
| 2002/0001305 A1* | 1/2002 | Hughes et al. | | 370/369 |
| 2006/0056799 A1* | 3/2006 | Na et al. | | 386/46 |

OTHER PUBLICATIONS

Marwan Krunz and Satish K. Tripathi, Impact of video scheduling on bandwidth allocation for multiplexed MPEG streams, Multimedia Systems, 1997, vol. 5, No. 6, pp. 347-357.

Marwan Krunz, Wei Zhao, and Ibrahim Matta, Scheduling and bandwidth allocation for the distribution of archived video in VOD systems, Telecommunication Systems, Sep. 1998, vol. 9, pp. 335-355.

OA mailed Mar. 30, 2005 from related U.S. Appl. No. 09/836,834.

NOA mailed Jul. 13, 2005 from related U.S. Appl. No. 09/836,834.

* cited by examiner

METHODS AND SYSTEMS FOR DISTRIBUTING MULTIMEDIA DATA OVER HETEROGENEOUS NETWORKS

CROSS-REFERENCE TO RELATED APPLICATIONS

This application is a continuation of application Ser. No. 09/836,834, filed Apr. 17, 2001, now U.S. Pat. No. 6,970,481 and entitled "METHODS AND SYSTEMS FOR DISTRIBUTING MULITMEDIA DATA OVER HETEROGENEOUS NETWORKS", and which is incorporated here by reference.

BACKGROUND OF THE INVENTION

1. The Field of the Invention

The present invention relates to the field of network communications. More specifically, the present invention relates to the real-time communication of multimedia information over heterogeneous networks.

2. The Related Art

Multimedia information includes information that is efficiently interpretable by one or more of the five human senses, but mostly by the human senses of sight and hearing. For example, video information is interpreted by the senses of sight and hearing. Audio information is interpreted by the sense of hearing. Some user interfaces such as Braille displays present information for interpretation by the sense of touch. However, with the advancement of appropriate user interfaces, multimedia information may also include taste and smell information as well.

Often, multimedia information is time-sensitive and should be rendered at the same speed that the information is sampled within some minimal jitter tolerances. This type of multimedia presentation will often be referred herein as "real-time". For efficient real-time delivery of multimedia data, the networks between the multimedia source and the multimedia sink should be abstracted so that the networks as a whole function as a constant delay network.

FIG. 1 illustrates a conventional network 100 for delivering multimedia data in real-time. A multimedia source 101 transmits multimedia packets 104 over a constant delay network 103 to a multimedia sink 102. Of course, there is always some variance in the delay, however small, introduced by any network. However, a "constant delay" network is a network in which the delay variance introduced by the network is below the minimal jitter tolerances required to support real-time presentation of the multimedia data.

As illustrated in FIG. 1, the constant delay network 103 may include a number of different network types that follow different standards. Nevertheless, in order to support real-time multimedia data delivery, each component network must support the abstraction of the networks as a whole into the constant delay network. There are generally two classifications of networks that support this kind of abstraction into an amalgamated constant delay network.

One such classification is constant delay networks. Thus, for example, the constant delay network 103 of FIG. 1 includes a component constant delay network 105. Constant delay networks receive multimedia data from a point on the network at a certain receive rate, and deliver the multimedia data to another point on the network at the same rate so that there is a relatively constant delay. A second such classification is variable delay networks that have a common notion of time.

It is possible even in such variable delay networks to emulate a constant delay network if the network supports a common notion of time across the network. For example, the IEEE 1394 serial bus is not inherently a constant delay network. However, the IEEE 1394 serial bus does support a common notion of time. The IEC 61883-x standard uses the common notion of time present in the IEEE 1394 serial bus to have the IEEE 1394 serial bus emulate a constant delay network to within the jitter tolerances required under the MPEG-2 standard.

Referring to FIG. 1, the constant delay network 103 also may include a variable delay network 106. If a series of one or more contiguous variable delay networks is interposed between the multimedia source 101 and the multimedia sink 104, the series of variable delay networks may emulate a constant delay network if the string of variable delay networks shares a common notion or reckoning of time.

Thus, conventional methods allow for the real-time delivery of multimedia data over a network that includes both constant delay networks and variable delay networks that have a common notion of time. However, there is a third classification of networks that is not compatible with being a component network in an amalgamated constant delay network under conventional standards. That third classification is a variable delay network that does not have a common notion of time.

Under conventional technology, real-time communication of multimedia data is not possible if one or more of the networks that must be traversed are variable delay networks that do not have a common notion of time. Accordingly, there exists no conventional infrastructure for seamlessly communicating multimedia over heterogeneous networks in real-time since those heterogeneous networks may include one or more variable delay networks that contain no common time reference across the network. Establishing such an infrastructure would allow for better access to multimedia content regardless of the heterogenic nature of the networks that intervene between the multimedia source and the multimedia sink.

SUMMARY OF THE INVENTION

The present invention extends to the real-time communication of multimedia data over heterogeneous networks that may include constant delay networks, variable delay networks that have a common reckoning of time, and variable delay networks that do not have a common reckoning of time. Currently, real-time communication of multimedia data may be accomplished point-to-point over specific networks. However, there is no conventional way of communicating such data in real-time over heterogeneous networks that include variable delay networks that have no common reckoning of time.

If there are any variable delay networks in the heterogeneous networks in which there is no common reckoning of time, a common reckoning of time is established in each of those networks. Then, the variable delay networks are emulated as one or more constant delay networks using the specific common time reckoning present in each variable delay network. Thus, the principles of the present invention allow for the real-time communication of multimedia information over heterogeneous networks. By so doing, a user may more flexibly access multimedia data in real-time regardless of the location of the individual.

In one aspect of the present invention, a constant delay network is emulated over a variable delay network despite the fact that the transmitter includes a transmitter application that interfaces with a link layer device driver over a variable delay interface. The transmitter application provides multimedia packets for transmission over the variable delay network. In addition, the transmitter application provides the multimedia packets with time stamps that represent the time according to the reckoning of the transmitter application. When the transmitter link layer device receives the multimedia packet, it calculates a new time stamp that is in accordance with a network time base, the new time stamp being based on the time stamp provided by the transmitter application. The receiver link layer controller then uses the new time stamp to evaluate the rendering time of the corresponding information in the packet.

Another aspect of the invention permits for communication over a variable delay network that does not inherently have a time base. Instead, the transmitter application periodically transmits a current time to various receiver devices on the network in order to synchronize the devices on the network. Then, the transmitter includes a time stamp that follows the synchronized time in order to permit the information in the multimedia packets to be presented at the appropriate time.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to the real-time communication of multimedia data over heterogeneous networks that may include constant delay networks, variable delay networks that have a common reckoning of time, and variable delay networks that do not have a common reckoning of time. If there are any variable delay networks in which there is no common reckoning of time, a common reckoning of time is established in each of those networks. Then, the common reckonings of times may be used to emulate the variable delay networks as one or more constant delay networks.

The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Figure 1:
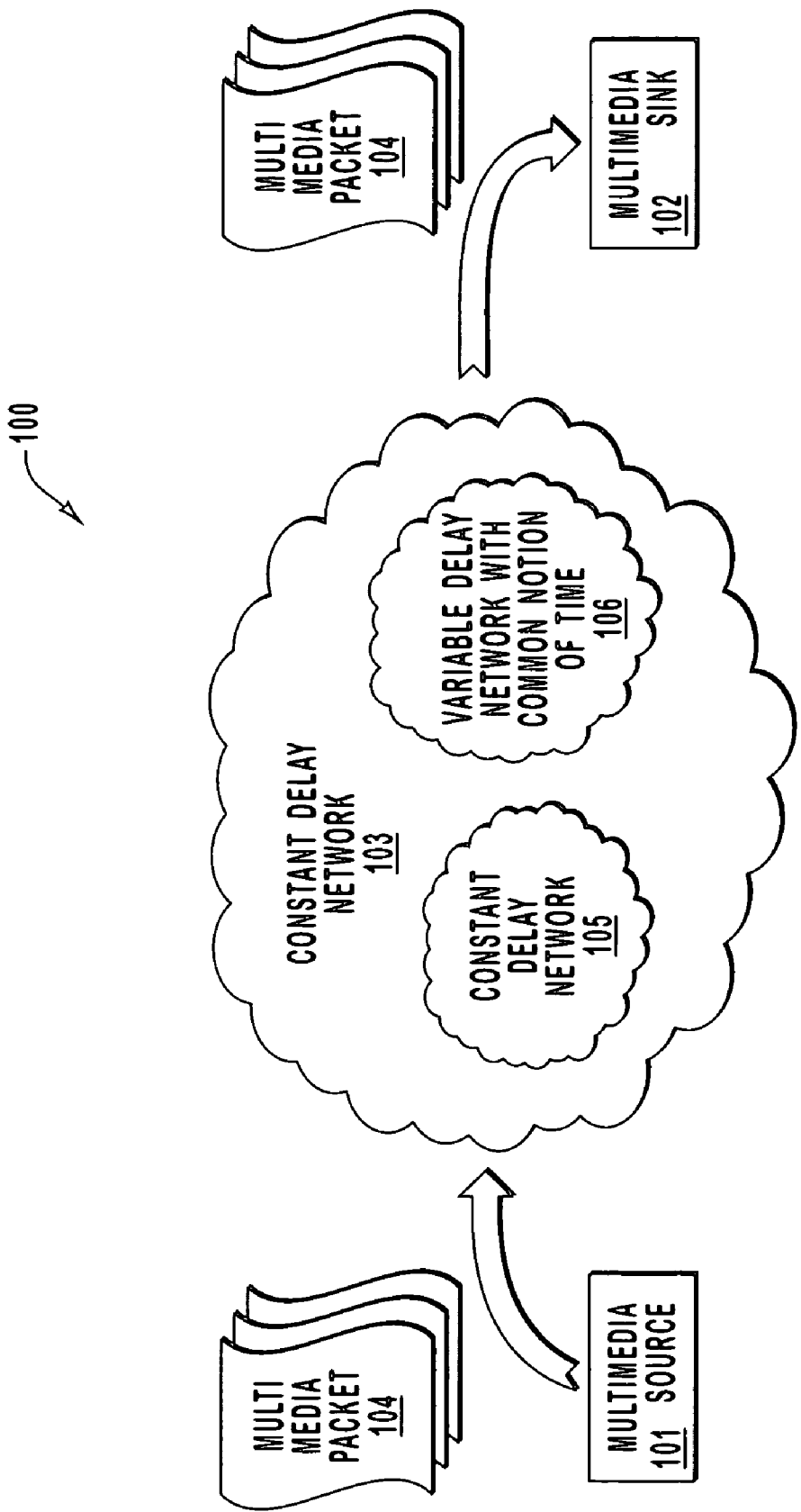
FIG. 1 schematically illustrates a constant delay network that supports real-time multimedia communication in accordance with the prior art.
Figure 2:
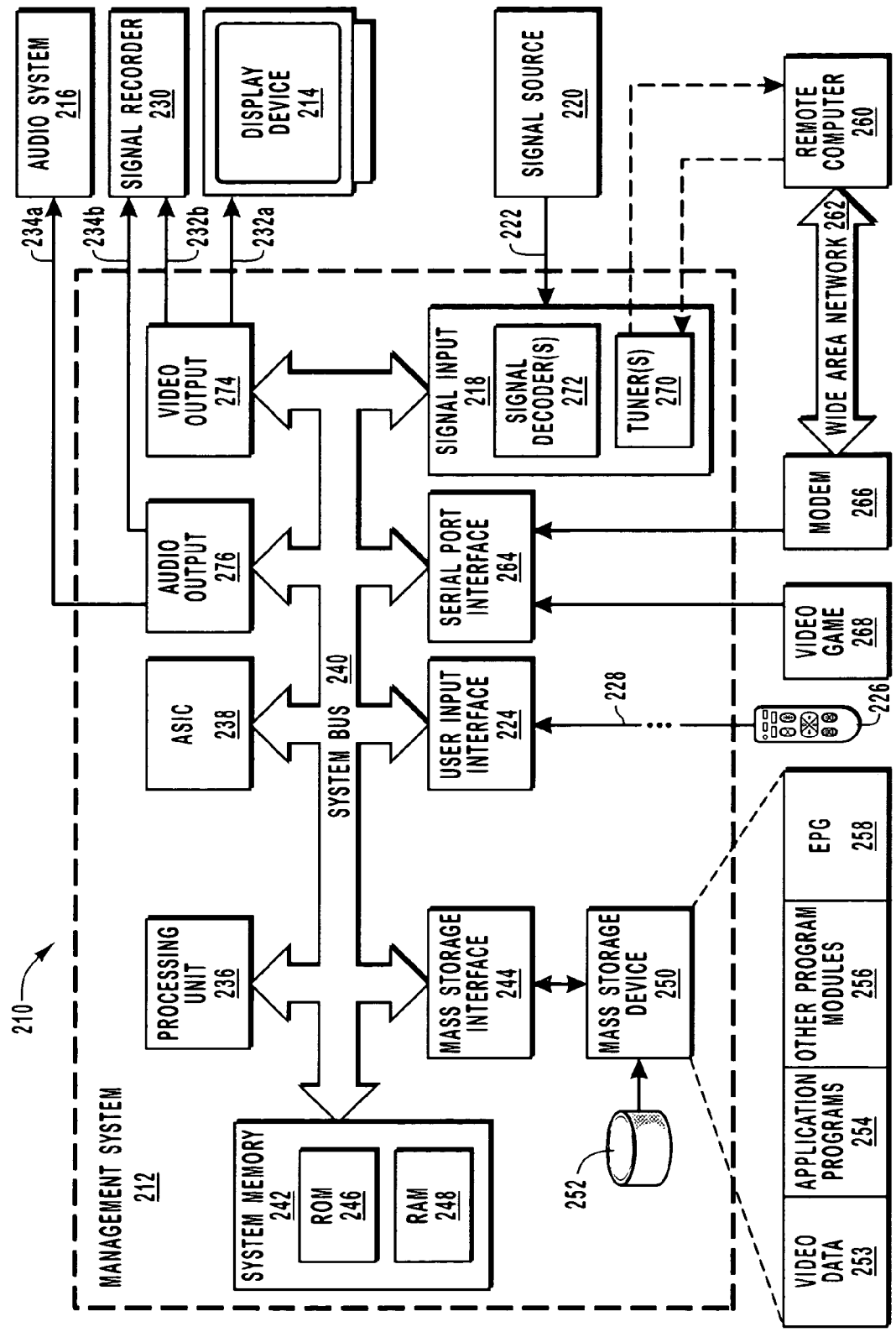
FIG. 2 illustrates an exemplary system that provides a suitable operating environment for the present invention.

FIG. 2 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing acts and steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, and any other device capable of processing data as described herein. Furthermore, the term "home entertainment system" is to be understood as a term that broadly describes a television-viewing or music listening environment, whether it is located in a viewer's home, at a place of business, in the public, or at any other location. Also for purposes of this description and in the claims, the term "programming" includes both the viewable and non-viewable portions of moving image data and/or its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal may use standard telephone lines, Integrated Services Digital Network (ISDN) lines, cable lines associated with cable television service, or the like to connect to the Internet or other wide area networks.

FIG. 2 illustrates a home entertainment system 210 that includes a management system 212, a display device 214 and an audio system 216. Management system 212 may be a set-top box or Internet terminal that has been adapted to perform the operations disclosed herein. Management system 212 may be integrally positioned with or separate from display device 214, which may be a high definition television display, a standard television display, a flat panel display, a projection device, an interface involving direct neural stimulation, a computer monitor, or any other device capable of displaying viewable video image data. Audio system 216 may be a speaker, a stereo system, or any device capable of emitting sound data, and similarly may be integrally positioned with or separate from display device 214.

Management system 212 includes a signal input 218, which receives programming from a signal source 220. The programming is transmitted from signal source 220 to signal input 218 via a programming input line 222, which can be a cable or optic connection, a terrestrial antenna system, a satellite system, or any device or system capable of transmitting programming to home management system 212.

The signal source 220 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 2 illustrates home entertainment system 210 as having a single programming input line 222 and a single signal source 220, there may also be a plurality of programming input lines that transmit programming from a plurality of signal sources. In such embodiments, the home entertainment system may receive the programming from one signal source or from a plurality of signal sources at a time.

Management system 212 also includes a user input interface 224, which receives input from an input device 226, such as a remote control, external special purpose or general-purpose processing device or computer, keyboard, microphone, mouse, or any other device capable of generating electronic instructions for management system 212. Input device 226 is communicatively coupled to management system 212 over an input link 228 so as to enable such control. Input device 226 generates electronic instructions over input link 228 in response to preprogrammed data or in response to a viewer pressing buttons on input device 226. Input device 226 may also control Web browser software within management system 212 as when management system 212 is a set-top box or an Internet terminal that has been adapted to perform the operations disclosed herein. For instance, input device 226 may be programmed to turn on home entertainment system 210 and to tune management system 212 to a channel.

FIG. 2 illustrates a signal recorder 230, which is capable of receiving video and/or audio data and recording the data on a storage medium. Video signals are transmitted to display device 214 and/or signal recorder 230 by video image links 232a and 232b, respectively, examples of which include a radio-frequency ("RF") link, an S-video link, a composite link, or any other equivalent form of video image link. Similarly, audio links 234a and 234b transmit audio data from management system 212 to audio system 216 and/or to signal recorder 230.

The operation of management system 212 is controlled by a central processing unit ("CPU"), illustrated as processing unit 236, which is coupled to an application-specific integrated circuit ("ASIC") 238 via system bus 240 and uses computer-executable instructions implemented in software and/or hardwired logic circuitry. Processing unit 236 and ASIC 238 are also coupled via a system bus 240 to various other system components, including system memory 242, mass storage interface 244, user interface 224 and signal input 218. Processing unit 236 may execute software designed to implement features of management system 212 including features of the present invention.

ASIC 238 contains circuitry that is used to implement certain functions of management system 212. Instructions, data, and other program modules necessary for the operation of processing unit 236 and necessary for the operation of the ASIC 238 may be stored in mass storage device 250 and/or system memory 242, which includes read-only memory ("ROM") 246 and random-access memory ("RAM") 248. System memory 242 is coupled to system bus 240 and mass storage device 250 is coupled to mass storage interface 244, which is in turn also coupled to system bus 240. Thus, ROM 246, RAM 248 and mass storage device 250 are communicatively coupled to ASIC 238 so as to be readable by ASIC 238 and so that data may be written from ASIC 238 to RAM 248 and to mass storage device 250. Mass storage device 250 may be a magnetic hard disk 252, but may also be any of the other computer-readable media referenced above.

Any desired computer-readable instructions or data, including application programs 254, other program modules 256, and an electronic programming guide ("EPG") 258, which specifies the broadcast times and channels of programs can be stored in mass storage device 250.

Mass storage device 250 may also be used to record video data 253, in which case, management system 212 performs the functions of a digital video recorder. Digital video data may be received by home entertainment system 210 from a variety of sources including signal source 220, remote computer 260, video game 268, input device 226 and the Internet.

EPG data may be obtained in a variety of manners. For instance, the EPG data can be supplied to management system 212 by a remote computer 260, such as a server, or from devices on the Internet and stored on mass storage device 250. The EPG data may be supplied on a regular basis to continually maintain a current schedule of programming at the management system 212. Alternatively, the EPG may be delivered to home entertainment system 210 by using a direct-dial communication over standard telephone lines, or by using data transmission over the cable television infrastructure, a satellite network, an over-the-air broadcast or any other available medium, including those previously mentioned.

In the embodiment where management system 212 is associated with the Internet, management system 212 may communicate with remote computer 260 via wide area network ("WAN") 262 using a variety of techniques, including interposing serial port interface 264 between the system bus 240 and a modem 266, using a wireless link, or other means for establishing communications over a WAN that may be internal or external to management system 212. Management device 212 is also capable of transmitting information via the Internet by direct-dial communication over standard telephone lines, or by using any other available communication medium.

While serial port interface 264 may be utilized to connect a modem 266 for communicating across a WAN, serial port interface may also be utilized to connect other consumer electronic devices, such as video game 268, and/or various input devices, such as a keyboard (not shown) or joystick (not shown), to management device 212.

Referring now to signal input 218, if the signal on programming input line 222 includes multiple channels, a tuner 270 included in signal input 218 tunes to a selected channel in the signal. Multiple tuners 270 can be used to provide enhanced viewing features, such as picture-in-picture, recording one channel while viewing another, and recording a plurality of channels simultaneously. A signal decoder 272 may convert video data from an analog format to a digital format, from a digital format to an analog format, or convent between varying digital formats, in the event that ASIC 238 and tuner 270 employ different formats. Video decoder 272 may also decode video data from a compressed video format (e.g. MPEG). In embodiments where the management system 212 includes multiple tuners 270, management system 212 may also include multiple signal decoders 272 to perform the operations disclosed herein.

Management system 212 may also include video output 274, which may include a video converter that switches between analog and digital formats as necessary when providing video data over video links 232a and 232b. Similarly, audio output 276 can include an audio converter to provide the necessary switching between analog and digital formats across audio links 234a and 234b.

While FIG. 2 and the corresponding discussion above provide a general description of a suitable environment in which the invention may be implemented, it will be appreciated that the features of the present invention disclosed herein may be practiced in association with a variety of different system configurations.

Figure 3:
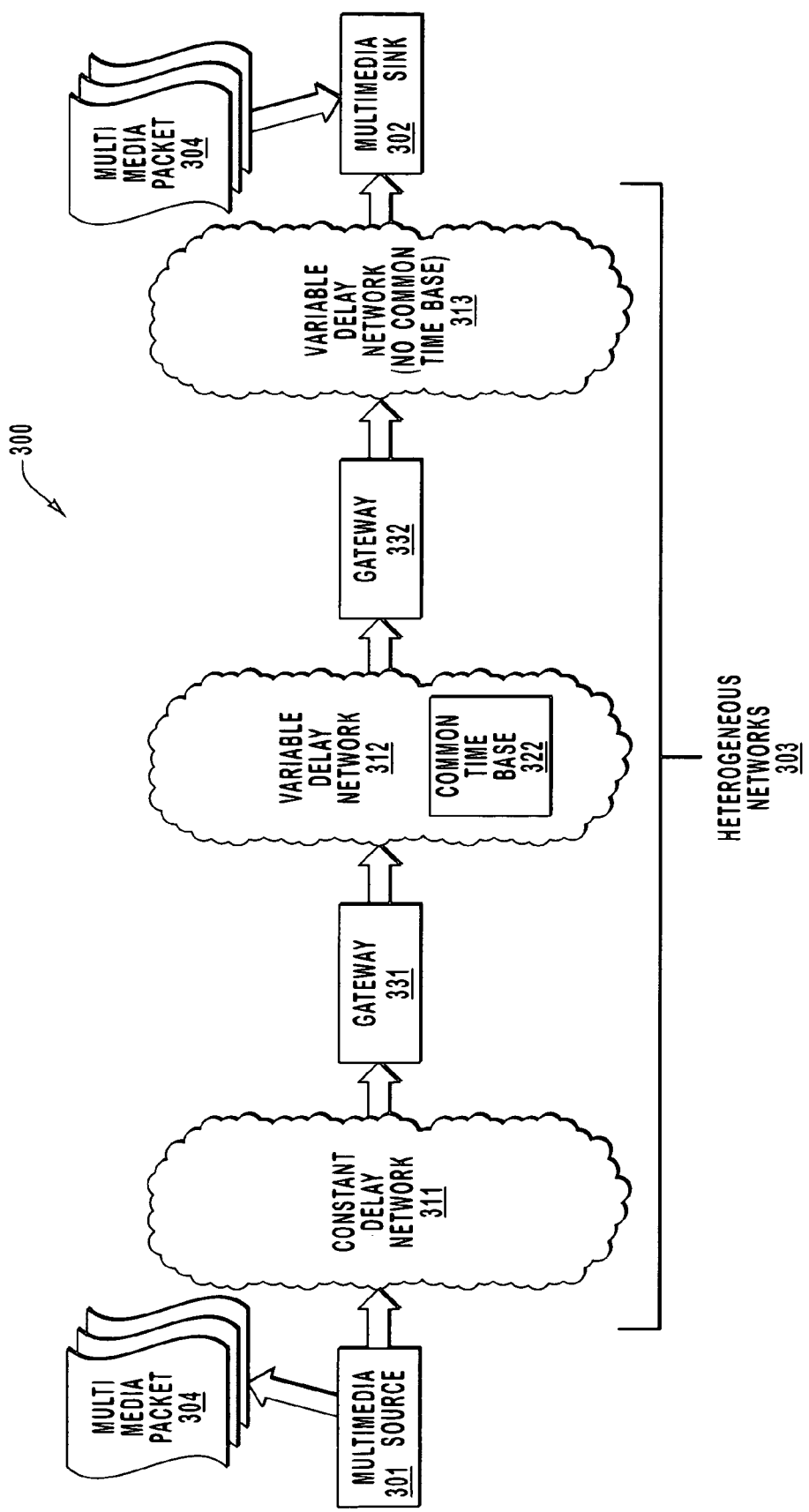
FIG. 3 schematically illustrates multimedia communication over a heterogeneous network that may include constant delay networks, variable delay networks with a common network time base, and variable delay networks without a common network time base.

FIG. 3 illustrates a network 300 in which a multimedia source 301 communicates a plurality of multimedia packets 304 over heterogeneous networks 303 to a multimedia sink 302. The wide area network 262 described above with reference to FIG. 2 is one example of a heterogeneous network, with the multimedia source 301 being the remote computer 260, and the multimedia sink 302 being the home entertainment system 210. However, the multimedia sink 302 may also be a personal digital assistant, a lap top computer, a desk top computer, a telephone, or any other device capable of receiving multimedia packets and rendering in real-time the associated multimedia information.

The heterogeneous networks 303 may include three classifications of networks as follows:

1) constant delay networks (e.g., constant delay network 311);
2) variable delay networks that have a common time base (e.g., variable delay network 312 that has common time base 322); and
3) variable delay networks that do not have a common time base (e.g., variable delay network 313 that does not have a common time base).

Although the heterogeneous networks 303 are illustrated as having only one of each classification of networks, the principles of the present invention may be applied to heterogeneous networks that have zero or one or more of each classification of networks. The heterogeneous networks are illustrated such that multimedia packets 304 would traverse, in order, the constant delay network, the variable delay network with a common time base, and the variable delay network without a common time base. This configuration is provided for illustrative purposes only. The principles of the present invention apply regardless of the specific order of each network within the routing path of a multimedia packet.

In order to transition the multimedia packets from one network to the next, a gateway is provided between each network in the heterogeneous networks. For example, gateway 331 receives multimedia packets from constant delay network 311, performs appropriate functions on those packets as described herein, and provides those packets over the variable delay network 312. In addition, gateway 332 receives multimedia packets from variable delay network 312, performs appropriate functions on those packets as described herein, and provides those packets over the variable delay network 313. The gateways receive multimedia packets from a previous network, reconfigure the multimedia packet if necessary to conform to the standards of the next network, and then transmit the potentially reconfigured multimedia packet onto the next network.

Figure 4:
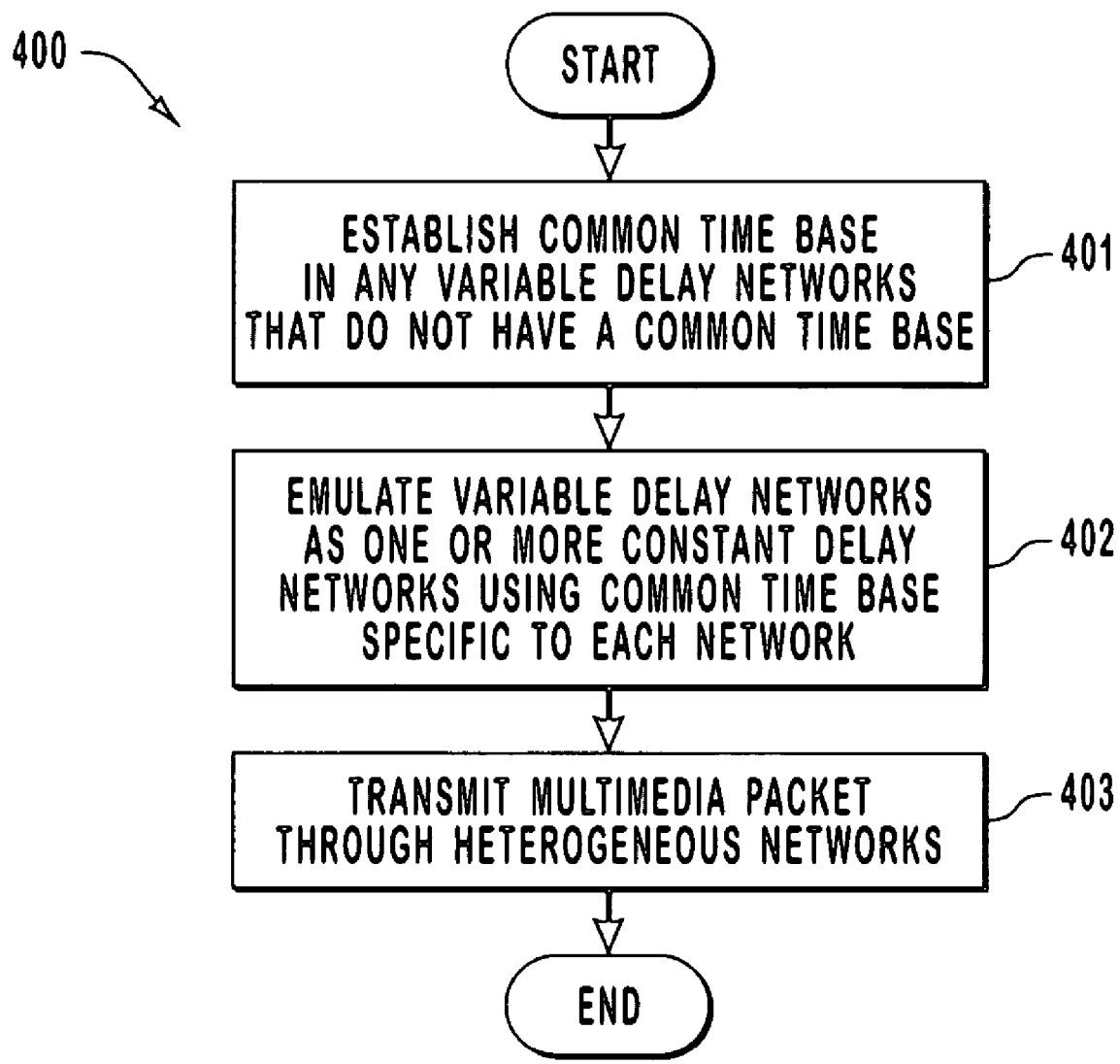
FIG. 4 illustrates a flowchart of a method of performing constant delay communication of multimedia packets over a heterogeneous network.
Figure 5:
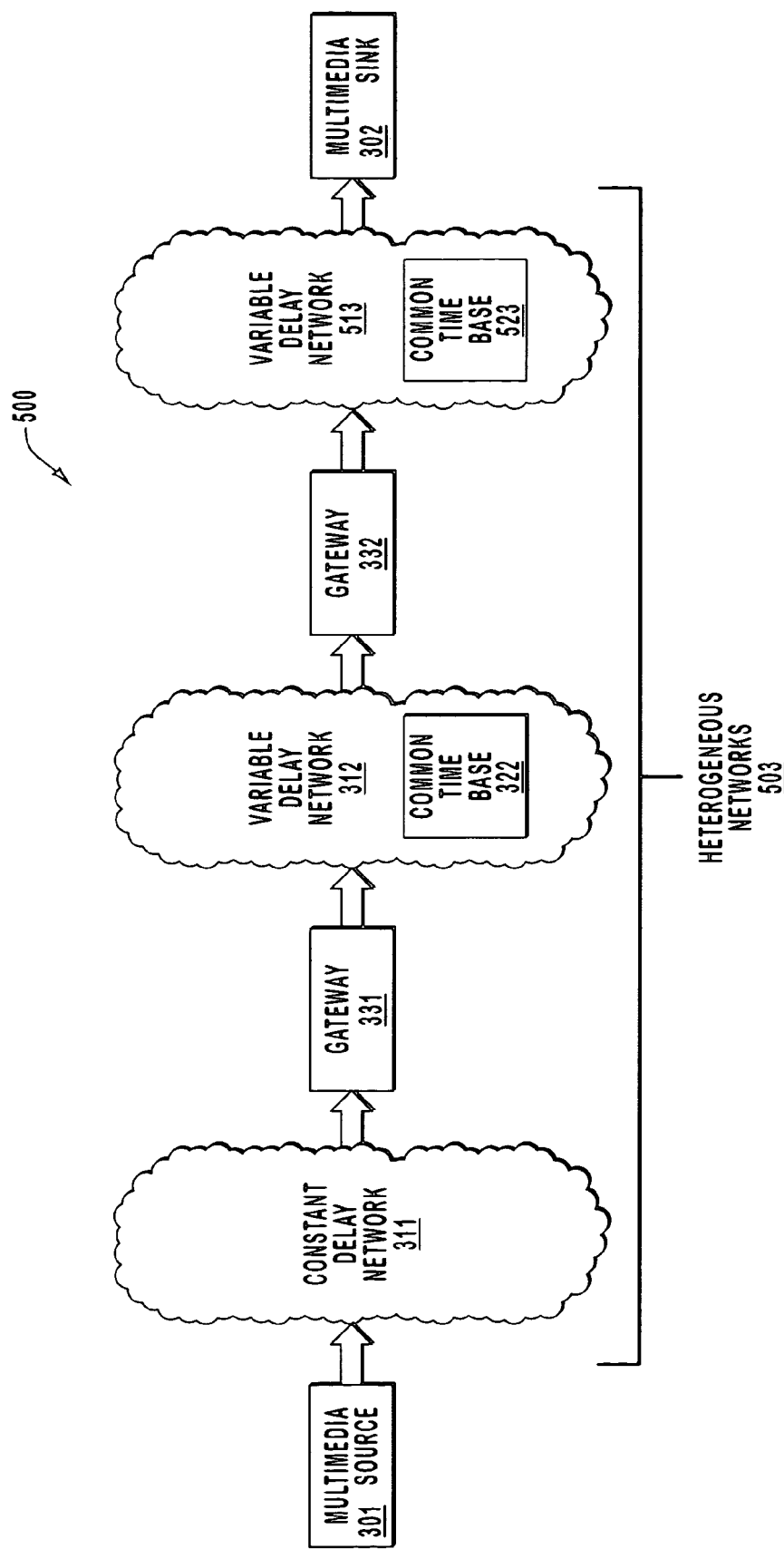
FIG. 5 illustrates the heterogeneous network of FIG. 3 in which the variable delay networks that did not have a common network time base are provided with a common network time base.
Figure 6:
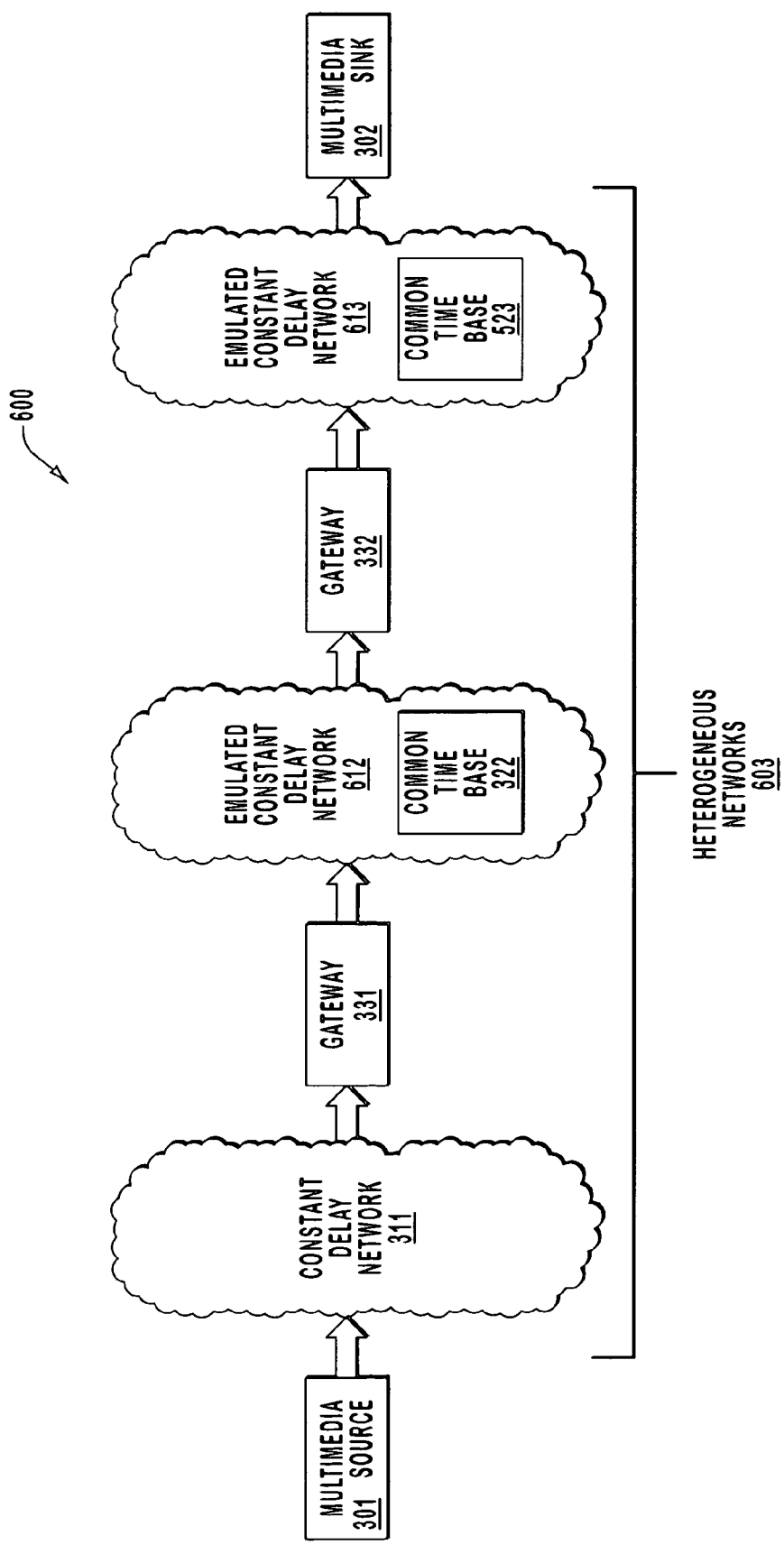
FIG. 6 illustrates the heterogeneous network of FIG. 5 in which the variable delay networks emulate constant delay networks using the common network time base.

FIG. 4 illustrates a method 400 of performing constant delay communication of a stream of multimedia packets over heterogeneous networks in accordance with the present invention. FIG. 3 illustrates an initial state of the heterogeneous networks before the method of FIG. 4 commences. FIGS. 5 through 6 show successive states of the heterogeneous networks that result from the performance of the method of FIG. 4. Accordingly, the method of FIG. 4 will be described with frequent reference to the network states illustrated in FIGS. 3, 5 and 6.

Initially, a common time reckoning is established in those variable delay networks in the heterogeneous networks that do not already have a common network time base (act 401). FIG. 5 illustrates the network state of the heterogeneous networks after act 401 is complete. The modified form of the heterogeneous networks 303 of FIG. 3 are illustrated as heterogeneous networks 503 in FIG. 5. The modified form of the variable delay network 313 of FIG. 3 is illustrated as variable delay network 513 in FIG. 5. Note that variable delay network 513 has a common time base 523, whereas the variable delay network 313 does not. At this stage, each of the networks in the heterogeneous networks 503 should either be a constant delay network, or a variable delay network that has a common network time base.

Returning to method 400 of FIG. 4, the variable delay networks are emulated as one or more constant delay networks using the common time reckonings followed by each variable delay network (act 402). This may be accomplished by the link layer, the application layer or another layer in the gateway including a time stamp in the multimedia packet, the time stamp representing a time that follows the common time reckoning of the next variable delay network. The time stamp may be related to the time that the packet is to be rendered and may be, for example, the time that the packet is transmitted. The receiving device may then use the time stamp to determine when the packet should be displayed. The time stamp may also be used to determine what time the multimedia packet should be transmitted by subsequent gateways, or perhaps what time future time stamps should indicate for subsequent networks. Referring to FIG. 5, the common time base 322 of the variable delay network 312 is used to emulate the variable delay network 312 as a constant. delay network. In addition, the common time base 523 of the variable delay network 513 may be used to emulate the variable delay. network 513 as a constant delay network.

FIG. 6 illustrates the network state of the heterogeneous networks after act 402 is complete. The modified form of the heterogeneous networks 503 of FIG. 5 are illustrated as heterogeneous networks 603 in FIG. 6. The emulated constant delay network 612 replaces the variable delay network 312 to emphasize its constant delay emulation. In addition, the emulated constant delay network 613 replaces the variable delay network 513 to emphasize its constant delay emulation. Now the network is sufficiently prepared to transmit multimedia packets from the multimedia source and the multimedia sink (act 403) in real-time.

As a multimedia packet transitions from one network to the next in the heterogeneous networks, the gateway may reformat or reconfigure the multimedia packet to conform with the requirements of the next network if necessary. In some cases, this may involve including a time stamp that conforms to the format of the next network and that represents an accurate time according to the time reckoning of the next network. Such time translation need not occur, however, if both the previous network and the next network recognize the same time reckoning, or if the next network is a constant delay network.

When transitioning from a constant delay network to a constant delay network, the gateway should ensure that the packet is transmitted onto the next network at a relatively constant time period after the packet was received from the previous network. This transition may be accomplished without interpreting, manipulating, or creating time stamps for the packet.

When transitioning from a constant delay network to a variable delay network, the gateway will receive the packet at a given receipt time from the constant delay network. The gateway will then generate a time stamp that represents a time according to the common time reckoning of the variable delay network, the time being equal to or having a relatively constant offset from the time that the packet was received from the constant delay network as measured using the common time reckoning of the variable delay network.

When transitioning from a variable delay network to a constant delay network, the gateway will receive the packet and interpret the time stamp according to the time reckoning of the variable delay network to determine the time (according to the time reckoning of the gateway) when the packet should be transmitted onto the constant delay network. The gateway will then transmit the packet onto the constant delay network at the given transmit time.

When transitioning from a variable delay network to another variable delay network, the gateway will leave the time stamp in the multimedia packet if both variable delay networks follow the same time reckoning and packet format. Otherwise, the gateway will translate the time stamp so that it represents a time according to the common time reckoning of the second variable delay network.

In some variable delay networks, there is no provision for a link layer controller to maintain a common reckoning of time with other devices on the network. Accordingly, the application layer itself may maintain the common time reckoning across the devices, calculate the appropriate time stamp, and/or include the time stamp in the multimedia packet. Which of these tasks the application layer performs may depend on the capabilities of the link layer that the application layer uses to forward multimedia packets through the gateway.

In this manner, even heterogeneous networks may emulate a constant delay network that allows for real-time communication of multimedia packets. Thus, the principles of the present invention provide for the delivery of multimedia packets regardless of the heterogenic nature of the networks that intervene between the multimedia source and the multimedia sink, even if some of the heterogeneous networks include variable delay network that do not themselves support a common notion of time. Thus, streaming multimedia data may be available regardless of the location of the user. Accordingly, the principles of the present invention represent a significant improvement over the state of the art.

Figure 7:
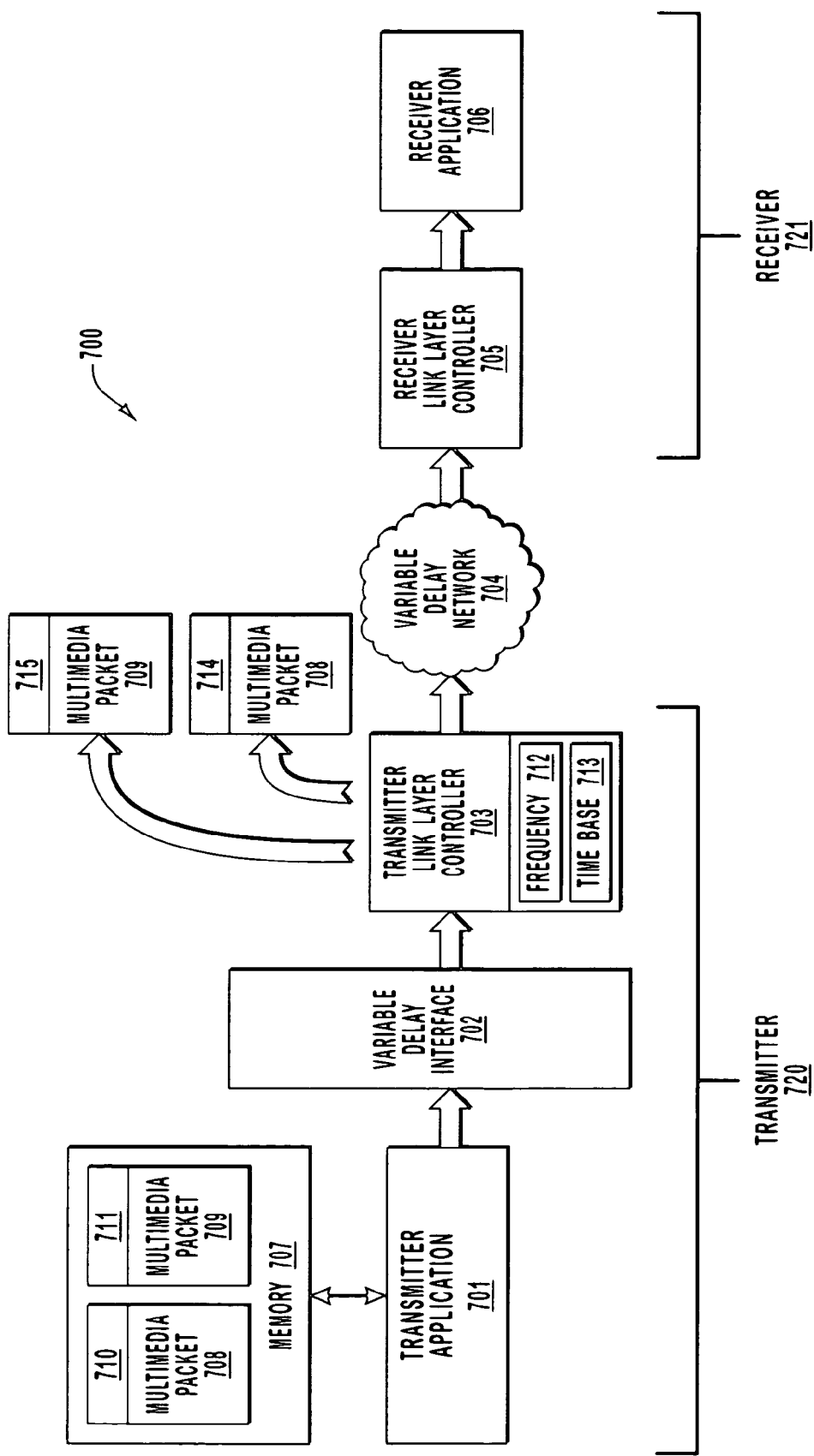
FIG. 7 illustrates a variable delay network in which there is an undedicated variable delay interface between the transmitter application and the transmitter link layer controller as when the variable delay interface is a PCI interface.

Various examples are now provided of how to emulate a constant delay network from a variable delay network. In particular, FIG. 7 illustrates a network configuration 700 that includes a transmitter 720 and a receiver 721 and a variable delay network 704 that intervenes between the transmitter 720 and the receiver 721.

The transmitter 720 includes a transmitter application 701 that stores a plurality of multimedia packets in a memory 707. For example, memory 707 stores two multimedia packets, a first multimedia packet 708 and a second multimedia packet 709. The transmitter 720 also includes a transmitter link layer controller 703 that actually retrieves the multimedia packets for transmission over the variable delay network 704. A variable delay interface 702 intervenes between the transmitter application 701 and the transmitter link layer controller 703. The receiver 721 includes a link layer controller 705, which receives the multimedia packets from the variable delay network 704 and provides those packets to the receiver application 706.

The variable delay network 704 may be, for example, an IEEE 1394 serial bus network. It should be noted that the conventional IEC 61883-x technology allow for constant network emulation of a IEEE 1394 serial bus network using an AV link layer controller that provides IEC 61883-x support. However, this conventional constant delay emulation relies on a constant delay between the transmitter application dispatching the multimedia packets, and the transmitter link layer controller receiving the multimedia packet. However, as illustrated in FIG. 7, there is a variable delay interface 702 between the transmitter application 701 and the link layer controller 703. Therefore, there is no reason to believe that the conventional constant delay emulation methods using an AV link layer controller that provides IEC 61883-x support would work in the network configuration illustrated in FIG. 7.

The variable delay interface 702 may be, for example, an undedicated PCI interface. In this case, the transmitter link layer controller 703 may be, for example, an OHCI link layer controller. The PCI interface has the advantage of being able to be shared among a variety of devices, not just the transmitter link layer controller 703. Accordingly, the PCI interface is well suited for general purpose computing systems. However, conventional technology does not provide for constant delay network emulation of a variable delay network when the transmitter of the variable delay network includes a variable delay interface between the transmitter application and the transmitter link layer controller. The principles of the present invention, however, allow for a PCI interface with an OHCI link layer controller to be used in a transmitter while still emulating a constant delay network.

Figure 8:
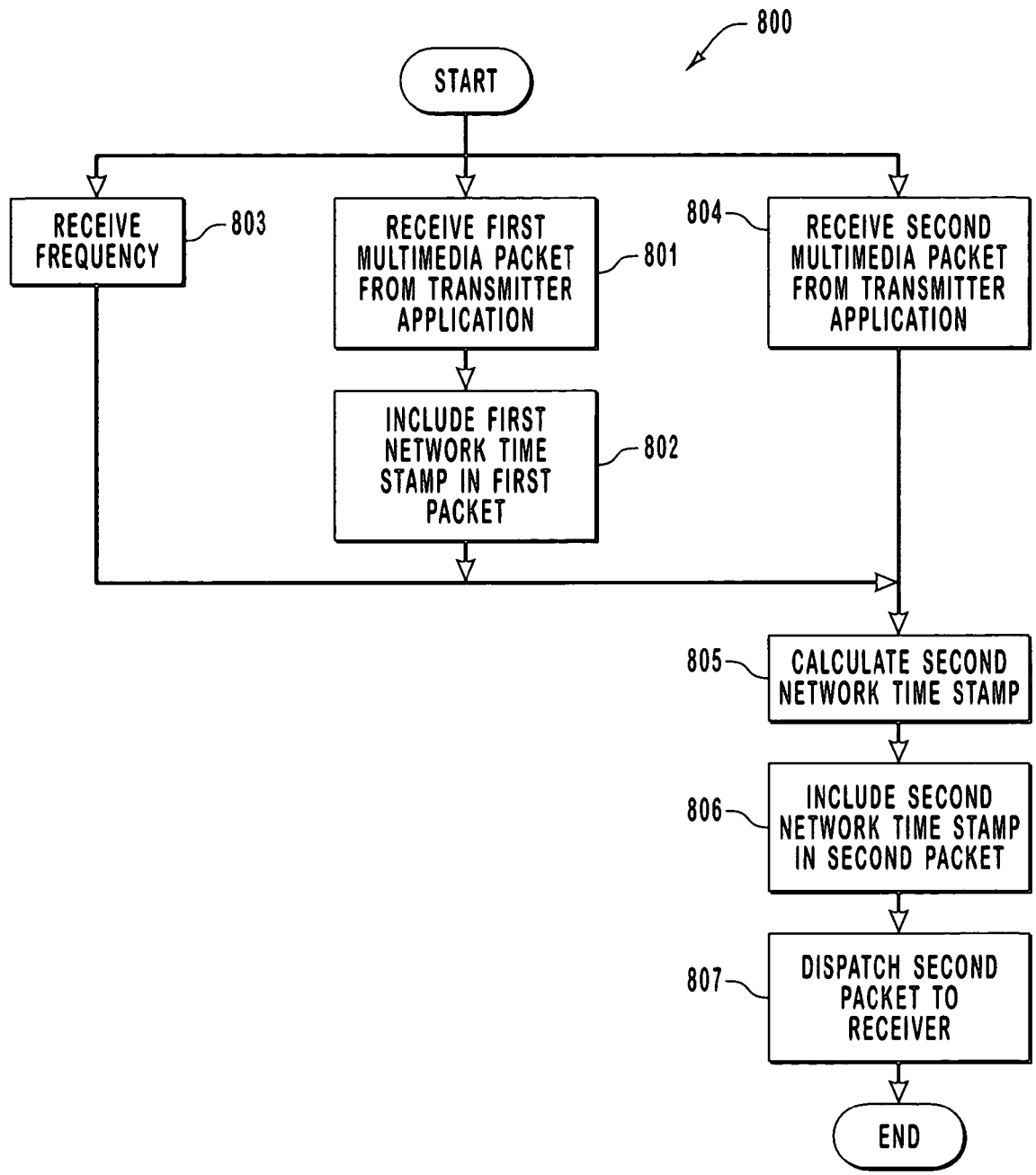
FIG. 8 illustrates a method for emulating a constant delay network in a variable delay network even if there is a variable delay interface between the transmitter application and the transmitter link layer controller.

FIG. 8 illustrates a method 800 of a transmitter link layer controller emulating a constant delay network over a variable delay network despite the undedicated variable delay interface in accordance with the present invention. The method 800 of FIG. 8 will be described with respect to the network configuration 700 of FIG. 7.

The transmitter link layer controller 703 receives a first multimedia packet 708 from the transmitter application 701 (act 801). The transmitter application 701 included a first transmitter application time stamp 710 in the packet, the time stamp 710 representing the relative time that the information in the first multimedia packet 708 should be rendered by the receiver application 706 as represented in the time base followed by the transmitter application 701. The transmitter link layer controller 703 then includes another time stamp 714 in the first multimedia packet 708 (act 802). The new time stamp represents the time that the corresponding information should be rendering with reference to the network time base.

The transmitter link layer controller 703 also receives information from the transmitter application 701 from which the transmitter link layer controller 703 may derive the frequency (act 803) of the time base used by the transmitter application with respect to the common time base (i.e., the network time base) recognized over devices on the variable delay network 704. The transmitter link layer controller 703 stores this information as frequency 712, and also stores the current time 713 in accordance with the common time base recognized over the variable delay network 704.

The transmitter link layer controller also receives a second multimedia packet such as multimedia packet 709 from the transmitter application 701 over the variable delay interface 702 (act 804). The transmitter application 701 included a transmitter application time stamp 711 in the packet, the time stamp 711 representing the relative time that the information in the second multimedia packet 709 should be rendered by the receiver application 706, as represented in the time base followed by the transmitter application 701.

The transmitter link layer controller 703 then calculates a network time stamp 715 that represents the relative time that the information in the second multimedia packet should be rendered by the receiver application 706 in accordance with the common network time base (act 805). The calculation is based on the first transmitter application time stamp 710, the second transmitter application time stamp 711, the frequency 712, and the first network time stamp 714. More specifically, this calculation may be made according to the following formula:

new_network_time=old_network_time+(new_STB_time−old_STB_time)*frequency where:

old_network_time=the stored value of the time stamped in the last packet;

old_STB_time=the stored value of the software time base provided in the last packet;

new_STB_time=the value of the software time base read from the current packet;

and frequency=the stored software time base frequency.

In actual implementation, a fixed offset may be added to the network time stamps to be in compliance with any applicable specification such as IEC 61883-x.

The transmitter link layer controller 703 then includes the calculated network time stamp 715 in the second multimedia packet 709 (act 806), and then dispatches the second multimedia packet 709 over the variable delay network 704 (act 807). The calculated network time stamp 715 may be included in the multimedia packet in accordance with the IEC 61883-x protocol. The receiver link layer controller 705 may then receive the multimedia packets and interpret the time stamp using the IEC 61883-x protocol. The link layer controller 705 may then forward the packets to the receiver application 706 which may then time the rendering of the corresponding information.

Figure 9:
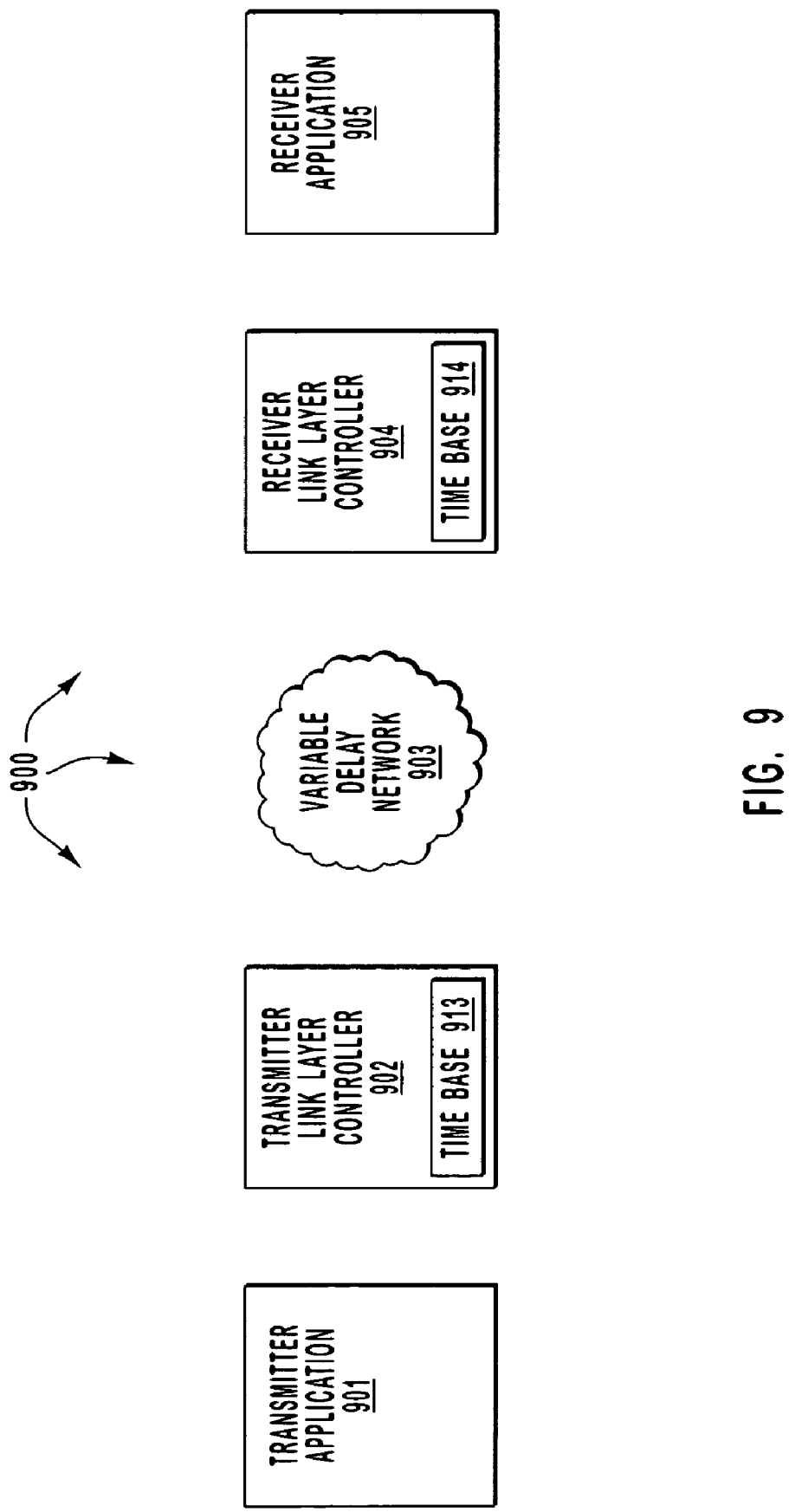
FIG. 9 illustrates a variable delay network in which a common time base is established.

FIG. 9 illustrates a network configuration 900 in which a transmitter application 901 controls the time base across a variable delay network 903. The transmitter application 901 is associated with a transmitter link layer controller 902 that stores a time base 913. A receiver application 905 is associated with a receiver link layer controller 904 that stores a time base 914, that is relatively synchronized with the time base 913.

Figure 10:
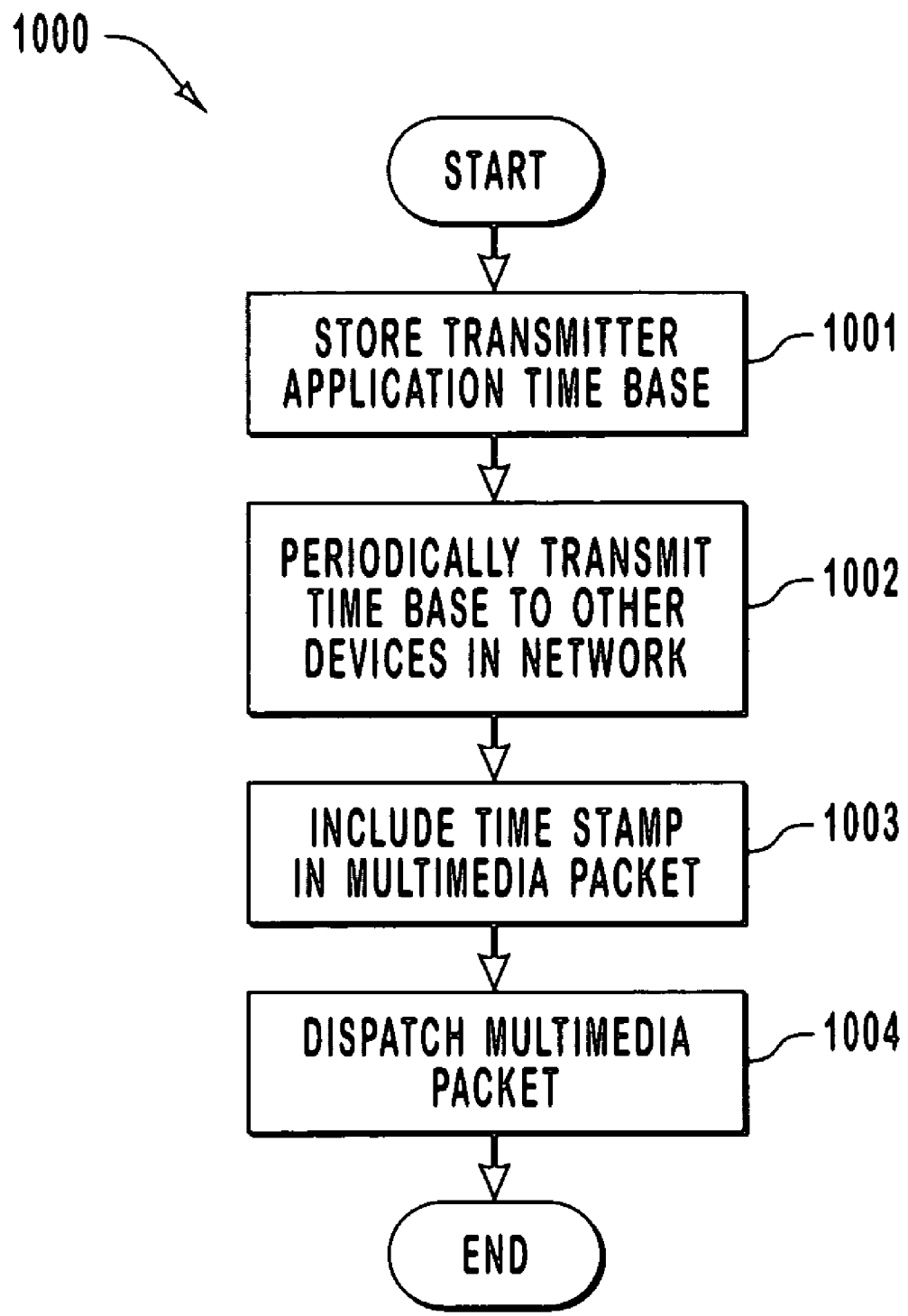
FIG. 10 illustrates a method of emulating a constant delay network using a variable delay network that is not conventionally equipped with a common network time base.

FIG. 10 illustrates a method 1000 for emulating a constant delay network over the variable delay network and will be described with respect to FIG. 9. The transmitter link layer controller 902 stores a transmitter application time base 913 received from the transmitter application 901 (act 1001).

The transmitter link layer controller periodically transmits the transmitter application time base to one or more devices including the receiver link layer controller 904 over the variable delay network 903 (act 1002). Software that provides data asynchronously to the multimedia packets may perform the task of synchronization. In this manner, the clock registers at the transmitter and receiver link layer controllers (i.e., the time base 913 and the time base 914) may be kept synchronized.

The transmitter link layer controller 902 includes the transmitter application time base in each packet that is to be transmitted over the variable delay network (act 1003) and then dispatches the packet over the network (act 1004). The receiver application 905 may then use the transmitter application time base in order to time the rendering of the corresponding information in the multimedia packets. An example of a variable delay-network in which the method 1000 of FIG. 10 may be implemented is an IEC 802.11 wireless network.

Therefore, the principles of the present invention provide for a means of emulating a constant delay network even over a group of heterogeneous networks that include variable delay networks that do not inherently support a common notion of time. Also, the principles of the present invention allow for constant delay network emulation on variable delay networks in which there is a variable delay interface between the transmitter application and the transmitter link layer controller, and in variable delay networks that have no inherent common network time base.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. A computing system in a network system that includes a multimedia source and a multimedia sink, the multimedia source transmitting a stream of multimedia packets to the multimedia sink over a plurality of heterogeneous networks, the heterogeneous networks including at least one constant delay network, at least one variable delay network that includes a common time reference, and a plurality of variable delay networks that do not themselves provide for a common reckoning of time references, the computing system comprising one or more computer-readable storage media having computer-executable instructions for implementing a method of performing constant delay communication of the stream of multimedia packets from the multimedia source over the heterogeneous networks to the multimedia sink, wherein the method comprises:

in a plurality of heterogeneous networks where delay between the plurality of heterogeneous networks is variable, at a first variable delay network that does not itself provide for a common time reckoning, the first variable delay network establishing a first specific common time reckoning for the first variable delay network, the first variable delay network being communicatively linked to a constant delay network;

in the plurality of heterogeneous networks, at a second variable delay network that does not itself provide for a common time reckoning, the second variable delay network establishing a second specific common time reckoning for the second variable delay network, the second variable delay network being communicatively linked to at least the first variable delay network, the second specific common time reckoning being different than the first specific common time reckoning;

in the plurality of heterogeneous networks, the first variable delay network emulating the first variable delay network using the first specific common time reckoning present in the first variable delay network, such that the plurality of heterogeneous networks as a whole emulate a constant delay network;

in the plurality of heterogeneous networks, the second variable delay network emulating the second variable delay network using the second specific common time reckoning present in the second variable delay network, such that the plurality of heterogeneous networks as a whole emulates a constant delay network; and transmitting a multimedia packet over the emulated constant delay network in the plurality of heterogeneous networks including at least the constant delay network, the first variable delay network and the second variable delay network.

2. A computing system in accordance with claim 1, wherein the method further comprises:

receiving the multimedia packet from a previous network in the heterogeneous networks;

as the multimedia packet transitions from the previous network to a next network in the heterogeneous networks, configuring the multimedia packet if necessary to conform with the requirements of the next network if the multimedia packet does not already conform with the requirements of the next network; and transmitting the reconfigured multimedia packet onto the next network.

3. A computing system in accordance with claim 2, wherein the method further comprises:

repeating the act of receiving the multimedia packet from a previous network, the act of configuring the multimedia packet if necessary, and the act of transmitting the reconfigured multimedia packet onto the next network for each network transition as the multimedia packet traverses the heterogeneous networks from the multimedia source to the multimedia sink.

4. The computing system in accordance with claim 2, wherein the next network is a variable delay network, and wherein the act of configuring the multimedia packet if necessary comprises the following:

generate a time stamp that represents a time in accordance with a common time reckoning of the variable delay network; and including the time stamp in the multimedia packet.

5. The computing system in accordance with claim 4, wherein the act of including the time stamp in the multimedia packet is performed by the link layer.

6. The computing system in accordance with claim 4, wherein the act of including the time stamp in the multimedia packet comprises the following:

including the time stamp in the multimedia packet before control of the multimedia packet transfers to the link layer associated with the next network.

7. The computing system in accordance with claim 6, wherein the act of including the time stamp in the multimedia packet before control of the multimedia packet transfers to the link layer comprises the following:

an application layer including the time stamp in the multimedia packet.

8. A computing system in a network system that includes a multimedia source and a multimedia sink, the multimedia source transmitting a stream of multimedia packets to the multimedia sink over a plurality of heterogeneous networks, the heterogeneous networks including a plurality of variable delay networks, the computing system comprising one or more computer-readable storage media having computer-executable instructions for implementing a method of performing constant delay communication of the stream of multimedia packets from the multimedia source over the heterogeneous networks to the multimedia sink even though one or more of the variable delay networks do not themselves provide for a common reckoning of time in the variable delay network, wherein the method comprises:

establishing a common time reckoning in each of the variable delay networks that do not themselves provide for a common time reckoning, wherein establishing the common time reckoning in each of the variable delay networks includes establishing a plurality of different common time reckonings for a plurality of the variable delay networks;

emulating the plurality of variable delay networks as one or more constant delay networks using the specific common time reckonings present in each of the plurality of variable delay networks, wherein the heterogeneous networks as a whole emulates a constant delay network, and wherein emulating the plurality of variable delay networks as one or more constant delay networks comprises:

receiving first and second multimedia packets from the multimedia source, the first multimedia packet including a first application time stamp for the multimedia source according to a time reckoning of the multimedia source, and the second multimedia packet including a second application time stamp for the multimedia source according to the time reckoning of the multimedia source;

including in the first multimedia packet a first network time stamp which represents the relative time that the information in the first multimedia packet should be rendered by the receiver application in accordance with the time reckoning system of the multimedia source;

calculating a second network time stamp representing the relative time that information in a multimedia packet should be rendered by the receiver in accordance with the time reckoning of the multimedia source, wherein the calculation includes adding to the first network time stamp a difference between the second application time stamp and the first application time stamp to create a sum that is multiplied by a frequency of the time reckoning of the multimedia source; and including the second network time stamp in the second multimedia packet; and transmitting a multimedia packet over the heterogeneous networks.

9. In a network system that includes a multimedia source and a multimedia sink, the multimedia source transmitting a stream of multimedia packets to the multimedia sink over a plurality of heterogeneous networks, the heterogeneous networks including a plurality of variable delay networks, a method of performing constant delay communication of the stream of multimedia packets from the multimedia source over the heterogeneous networks to the multimedia sink even though one or more of the variable delay networks do not themselves provide for a common reckoning of time in the variable delay network, wherein the method comprises:

establishing a common time reckoning in each of the variable delay networks that do not themselves provide for a common time reckoning, wherein establishing the common time reckoning in each of the variable delay networks includes establishing a plurality of different common time reckonings for a plurality of the variable delay networks;

emulating the plurality of variable delay networks as one or more constant delay networks using the specific common time reckonings present in each of the plurality of variable delay networks, wherein the heterogeneous networks as a whole emulates a constant delay network, and wherein emulating the plurality of variable delay networks as one or more constant delay networks comprises:

receiving first and second multimedia packets from the multimedia source, the first multimedia packet including a first application time stamp for the multimedia source according to a time reckoning of the multimedia source, and the second multimedia packet including a second application time stamp for the multimedia source according to the time reckoning of the multimedia source;

including in the first multimedia packet a first network time stamp which represents the relative time that the information in the first multimedia packet should be rendered by the receiver application in accordance with the time reckoning system of the multimedia source;

calculating a second network time stamp representing the relative time that information in a multimedia packet should be rendered by the receiver in accordance with the time reckoning of the multimedia source, wherein the calculation includes adding to the first network time stamp a difference between the second application time stamp and the first application time stamp to create a sum that is multiplied by a frequency of the time reckoning of the multimedia source; and including the second network time stamp in the second multimedia packet; and transmitting a multimedia packet over the heterogeneous networks.

* * * * *